(Model.)
D. SMITH.
Car Coupling.
No. 238,170.   Patented Feb. 22, 1881.
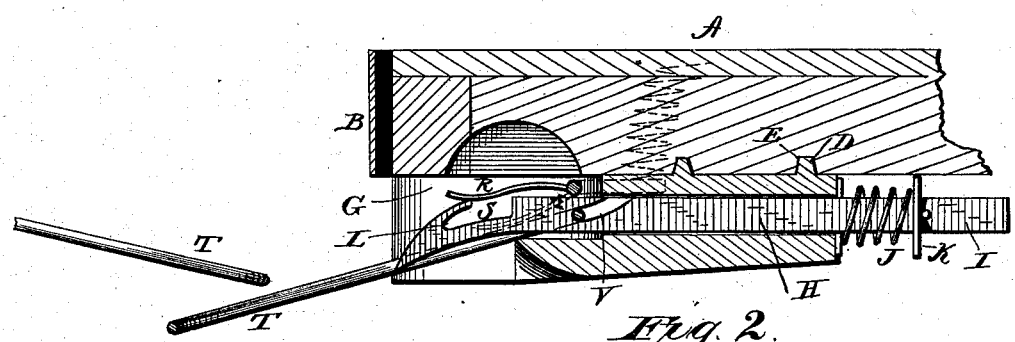
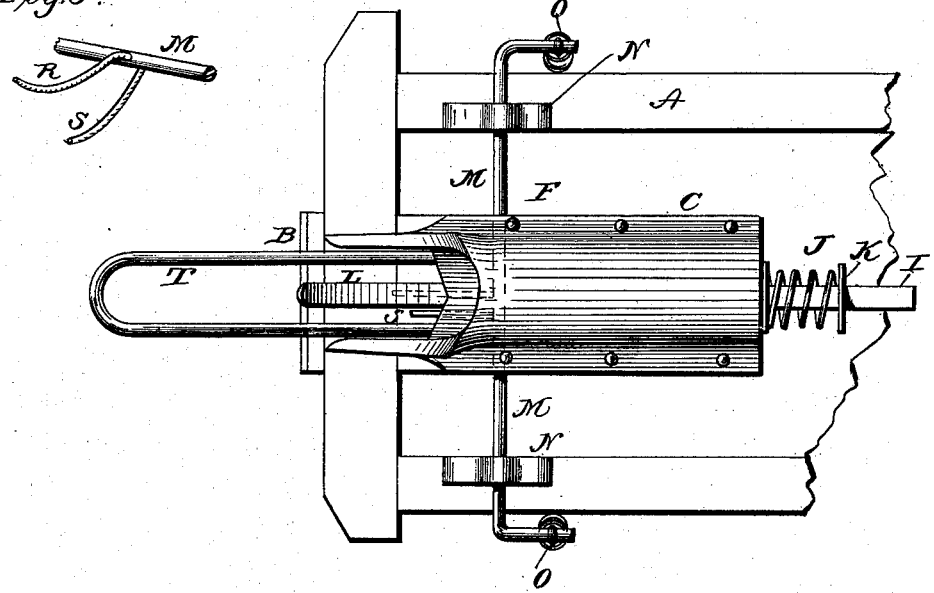
Witnesses.
Franck L. Ouraud,
J. J. McCarthy.
Inventor
Duncan Smith
By Alexander Mason
atty

UNITED STATES PATENT OFFICE.

DUNCAN SMITH, OF MACON, GEORGIA.

CAR-COUPLING.

SPECIFICATION forming part of Letters Patent No. 238,170, dated February 22, 1881.

Application filed November 27, 1880. (Model.)

*To all whom it may concern:*

Be it known that I, DUNCAN SMITH, of Macon, in the county of Bibb, and in the State of Georgia, have invented certain new and useful Improvements in Car-Couplings; and I do hereby declare that the following is a full, clear, and exact description thereof, reference being had to the accompanying drawings, and to the letters of reference marked thereon, making a part of this specification.

This invention relates to certain improvements in car-couplers; and it has for its objects to provide a means whereby the cars, whether of the same or different heights, may be automatically coupled when brought together, and by which they can be readily uncoupled from either side without necessitating the entrance of an employee between the cars, thus avoiding the risk of injury attendant thereto, as more fully hereinafter specified. These objects I attain by the mechanism and devices illustrated in the accompanying drawings, in which—

Figure 1 represents a longitudinal sectional view of a portion of a car and the draw-head and draw-bar of the coupler; and Fig. 2 represents a bottom view of a portion of a car, showing my improved coupler; and Fig. 3, a detached view of the operating-rod.

The letter A indicates the platform of a car constructed in the ordinary manner, and provided with the usual buffer B.

C indicates the draw-head of the coupler, which is secured to the under side of the platform by means of the transverse ledges D formed on said head, which set in transverse grooves E formed in the timbers of the platform, the said head being confined to its seat by means of the bolts F. The head is provided with the usual opening or recess G at its forward end for the reception of the end of the coupling-link of the opposite car. The draw-head is also provided with a longitudinal opening, H, extending entirely through it, in which is located a draw-bar, I, which projects at the rear and is provided with a spring, J, bearing against the rear of the draw-head, and a shoulder, K, on said draw-bar, whereby said draw-bar is permitted to have a slight yielding movement longitudinally in the draw-head. The draw-bar at its forward end, which lies in the recess in the forward end of the draw-head, is formed with a hook, L, to engage the coupling-link of the opposite car.

The letter M indicates a transverse bar passing through the draw-head and journaled in bearings N secured to the platform of the car. The ends of said bar project beyond the platform on each side, and are bent at right angles horizontally, and connected with the springs O, by which the bar is held and returned to a normal position, as more fully hereinafter specified. The bar M is provided with two arms, R S, one of which is curved upward and rests upon the hooked end of the draw-head, so as to close the hook and prevent the coupling-link from being jolted out when in a normal position, while at the same time it permits the link to automatically enter the hook when the cars are brought together. The other serves to elevate the link when the bar is turned by means of one of its bent ends, so that the link can be pulled from the hook and the cars uncoupled.

The letter T indicates a coupling-link, which is permanently secured in a slot, U, in the draw-bar. One of these links is provided in each coupling-head, and is intended to be engaged by the hook on the draw-bar of the opposite car, the links on the respective cars being so arranged relatively that that on the highest car will engage the hook on the opposite car, and thus insure the proper coupling under all circumstances.

The operation of my invention is as follows: When the cars approach each other the coupling-links are in the position indicated in Fig. 1, the coupling-link of one car advancing slightly above the other. Upon coming together the upper coupling-link rides upon the lower one, which retains its inclined position, and by it is guided to the hooked coupling-head, with which it engages. It will thus be seen that the uppermost coupling-link alone, on whichever car it may be located, will engage a coupling-head, leaving the other free.

Having thus fully described my invention, what I claim, and desire to secure by Letters Patent, is—

In combination with the hooked draw-bar, located in the draw-head and held in a normal position therein by means of a suitable spring, the transverse bar extending to each side of the car and bent at right angles and connected with suitable springs, the said bar being provided with arms to close the hook in the draw-head and elevate the link therefrom, substantially as specified.

In testimony that I claim the foregoing I have hereunto set my hand this 20th day of November, 1880.

DUNCAN SMITH.

Witnesses:
H. S. GLOVER, Jr.,
L. J. HARRIS.